Figure 1:
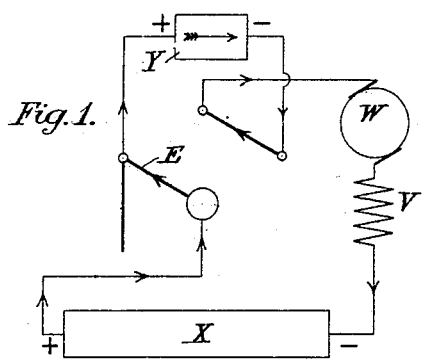

No. 624,813. Patented May 9, 1899.
O. C. IMMISCH.
MEANS FOR REGULATING SPEED OF ELECTRIC MOTORS.
(Application filed Mar. 7, 1898.)

(No Model.) 4 Sheets—Sheet 1.

No. 624,813. Patented May 9, 1899.
O. C. IMMISCH.
MEANS FOR REGULATING SPEED OF ELECTRIC MOTORS.
(Application filed Mar. 7, 1898.)

(No Model.) 4 Sheets—Sheet 2.

No. 624,813.　　　　　　　　　　　　　　　　　Patented May 9, 1899.
O. C. IMMISCH.
MEANS FOR REGULATING SPEED OF ELECTRIC MOTORS.
(Application filed Mar. 7, 1898.)

(No Model.)　　　　　　　　　　　　　　　　　4 Sheets—Sheet 3.

No. 624,813. Patented May 9, 1899.
O. C. IMMISCH.
MEANS FOR REGULATING SPEED OF ELECTRIC MOTORS.
(Application filed Mar. 7, 1898.)
(No Model.) 4 Sheets—Sheet 4.
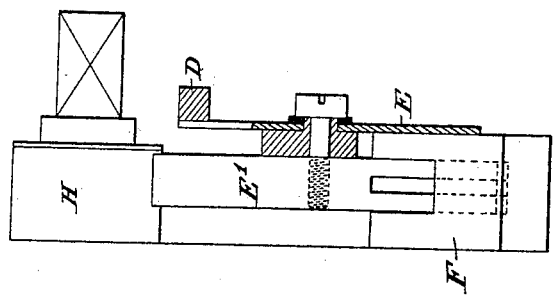
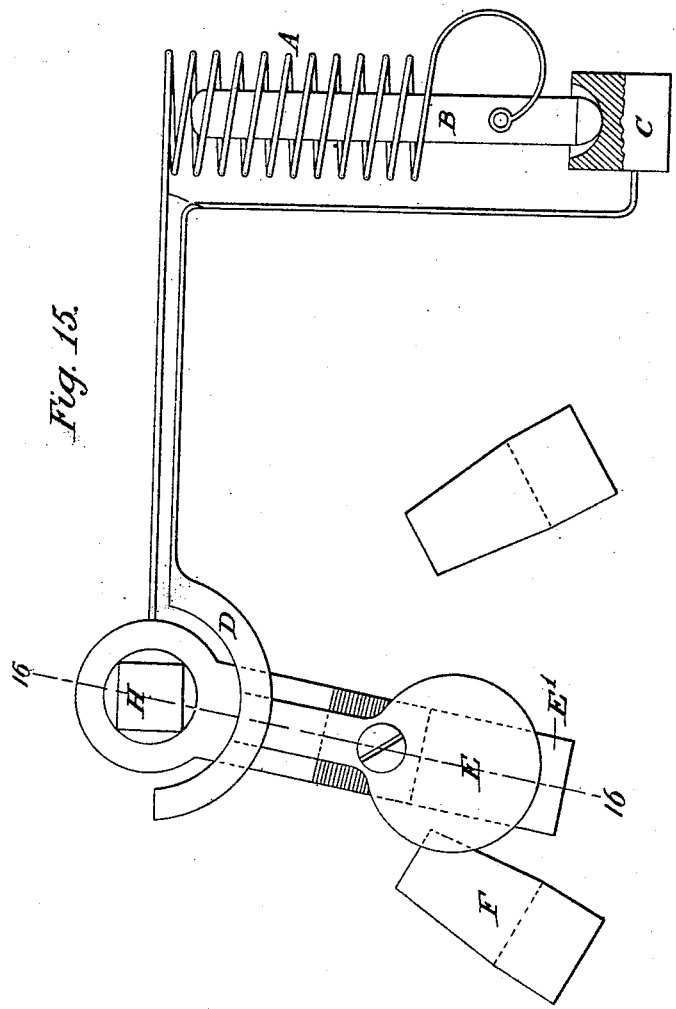

UNITED STATES PATENT OFFICE.

OTTO CLAUDE IMMISCH, OF LONDON, ENGLAND.

MEANS FOR REGULATING SPEED OF ELECTRIC MOTORS.

SPECIFICATION forming part of Letters Patent No. 624,813, dated May 9, 1899.

Application filed March 7, 1898. Serial No. 672,892. (No model.)

*To all whom it may concern:*

Be it known that I, OTTO CLAUDE IMMISCH, a subject of the Queen of Great Britain, residing at London, in the county of Middlesex, England, have invented new and useful Improvements in Means for Regulating the Speed of Electric Motors, (for which I have made application for Letters Patent in Great Britain, No. 22,339, bearing date September 29, 1897, and No. 2,784, bearing date February 3, 1898,) of which the following is a specification.

This invention is designed principally for varying the speed of autoelectric vehicles.

The principal object of the invention is to secure in a simple, economical, and convenient manner a variety of determined speeds by current regulation.

The invention consists principally in the combination, with a motor and a driving-battery therefor, of an auxiliary battery and means for switching the current of the auxiliary battery in opposition to the current of the main battery, whereby the electromotive force of the system is lowered and the speed of the motor decreased, or in supplement to the main current, whereby the electromotive force is augmented and the speed increased, or in cut-out position respecting the main current for adjusting the speed at a point between the two extremes. In this system of regulation the tension of the whole circuit may be quickly adjusted to a given rate of speed according to the known power of the auxiliary battery, which may contain a greater or less number of cells or greater or less capacity, according to the kind of service the vehicle has to perform. The general working of the system may be such that by turning a single handle the variety of speeds may be obtained.

The invention consists, further, in having the motor or main battery used in connection with the auxiliary battery and current-shifting means heretofore referred to arranged in parts adapted to be shifted from series to multiple connection or the reverse for further varying the speed of the motor.

Another object of the invention is to prevent serious sparking at the switch when the contact is broken to change the connections or break the circuit. To this end the movable switch-arm through which the current passes is duplex, the two parts thereof being insulated from each other and so disposed in regard to the fixed contacts that when one part of the switch-arm breaks the working circuit the other part of said switch-arm lags behind and remains in contact, said insulated parts of the switch-arm being connected through an electromagnet having a movable core. This core under ordinary working conditions forms a part of the main circuit. When the first part of the switch-arm moves away from its contact, the full force of the current passes around the magnet and the core is powerfully drawn within its helix, thereby breaking the main circuit. The spark which results from the breaking of the circuit, therefore, does not take place in the switch itself, but may be shifted to any other convenient part of the circuit where it can do no harm.

Figure 2:
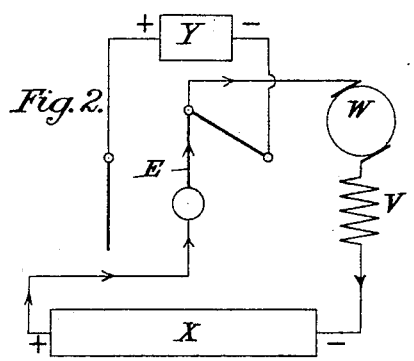
Figure 3:
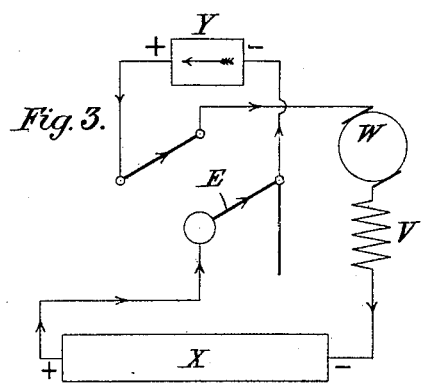

Figures 1 to 3, inclusive, of the accompanying drawings represent diagrams of one form of this invention adapted for three different speeds, Fig. 1 showing the slow-speed adjustment, Fig. 2 the intermediate-speed adjustment, and Fig. 3 the high-speed adjustment. Figs. 4 to 9, inclusive, represent diagrams of another form of this invention adapted for five different speeds, the several diagrams showing the several adjustments for the various speeds. Figs. 10 to 14 represent diagrams of another form of this invention adapted for five different speeds, the several diagrams showing the several adjustments for the various speeds. Fig. 15 represents a front elevation, partly in section, of a form of switch which is preferably used as a part of this speed-regulating means. Fig. 16 represents a side elevation thereof.

The same reference letters and numerals indicate the same parts in all the figures.

In carrying out the first object of my invention the mechanical details of the switch used for this purpose are not important, as the desired results can be obtained in several ways and by any suitable switch mechanism. I shall confine myself to giving a number of diagrams clearly showing the manner in which I make the set of auxiliary cells serve my purpose of varrying the speed.

The simplest form of the invention herein illustrated is shown in Figs. 1, 2, and 3, in which three speeds may be produced. In all these diagrams X represents any suitable main battery, Y any suitable auxiliary battery, E any suitable movable switch-arm, W any suitable motor, and V the motor-field.

In the positions shown in Fig. 1 the switch is in position connecting the positive terminal of the auxiliary battery with the positive terminal of the main battery and the electromotive force of the auxiliary battery is opposed to that of the main battery to an extent corresponding with the opposing force of the auxiliary battery. In this condition of the switch the minimum speed is attained.

In the position shown in Fig. 2 the switch is in position cutting out the auxiliary battery from the main battery, and the electromotive force produced is that derived from the main battery only. In this condition of the switch a normal speed is attained.

In the positions shown in Fig. 3 the switch is in position connecting the positive terminal of the auxiliary battery with the negative terminal of the main battery, and the electromotive force of the auxiliary battery is united with that of the main battery and the maximum speed is attained.

Figure 4:
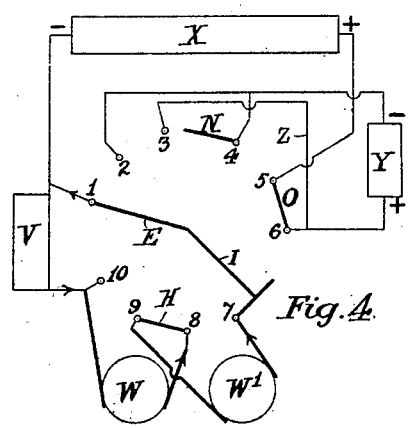

In Figs. 4 to 9, inclusive, the motor used in connection with the main and auxiliary batteries has two commutators adapted to be shifted from series to multiple connection or the reverse, whereby two additional adjustments for speed variation are obtained. The arrows indicate the courses of the current under the several connections. In this arrangement W W' represent a motor having two commutators. V represents the field. X is the main battery, and Y the auxiliary cells. Fig. 4 shows the first position, in which the switch-arm E is in contact with contact-piece 1, and in this position of the switch the main battery X and the auxiliary cells Y are cut out, the circuit being closed through the contact-piece 1, the field V, the two commutators W W' in series stop 7, the switch-arm I, and the arm E.

Figure 5:
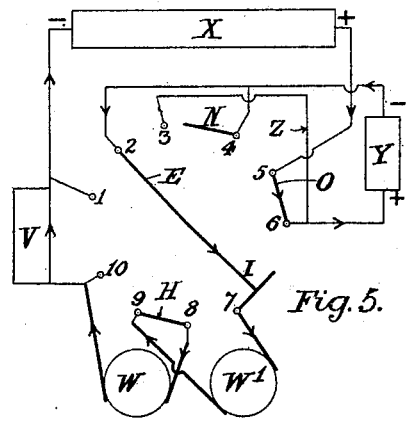

In the position shown in Fig. 5 the switch-arm E is in contact with contact-stop 2, and the circuit is closed through switch-arm I, contact 7, commutators W' W, which are still in series, the field V, main battery X, and auxiliary cells Y, which are opposing the electromotive force of the main battery, stop 2, and switch-arm E.

Figure 6:
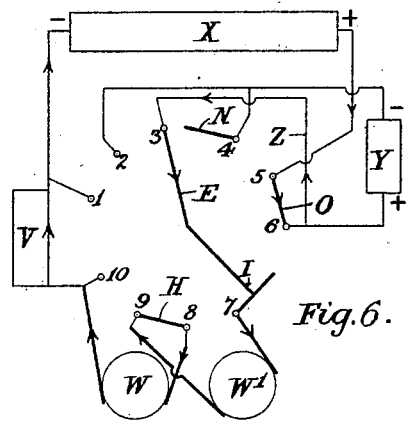

In Fig. 6 the switch-arm E is in contact with stop 3, and the circuit is through switch-arms E and I, then through the commutators W' W, which still remain in series, thence through the field V, the battery X, stops 5 and 6, and so to contact 3, the auxiliary cells Y being cut out.

Figure 7:
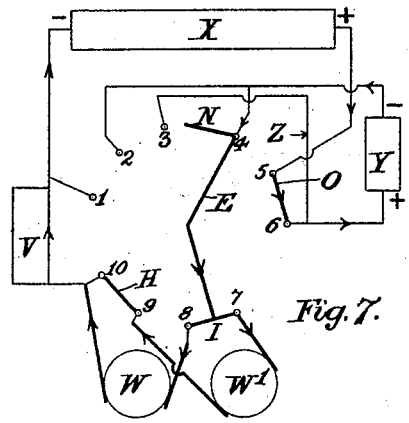

In Fig. 7 switch-arm E is in contact with contact-stop 4 and switch-arm I with the contacts 7 and 8, so that commutators W W' are in parallel. The circuit is closed through switch-arms E and I, contacts 7 and 8, through the two commutators W W' in parallel, thence through the field, the main battery X, auxiliary cells Y, which are opposing the electromotive force of the main battery, and to contact-stop 4.

Figure 8:
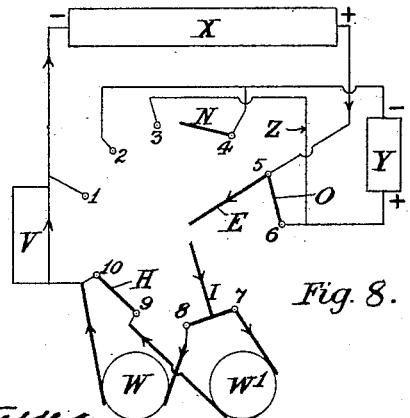

In Fig. 8 the switch-arm E is in contact with the contact-stop 5, and the circuit is through switch-arms E and I, contact-stops 7 and 8, and so through the commutators W W' in parallel, thence through the field V, main battery X, and so to contact-stop 5, the auxiliary cells Y being cut out.

Figure 9:
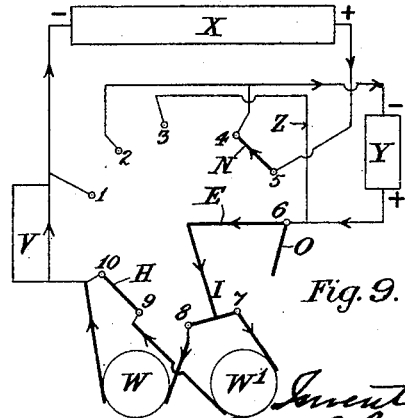

In Fig. 9 the switch-arm E is in contact with the contact-stop 6, and the circuit is closed through the switch-arms E and I, contacts 7 and 8, and so through the commutators W W' in parallel, thence to the field V, main battery X, contact-stops 5 and 4, then through the auxiliary cells Y, increasing the electromotive force of the main battery, and then to stop 6.

In Figs. 10 to 14, inclusive, the main battery is divided into a plurality of parts adapted to be shifted from series to multiple connection or the reverse and used either in series or multiple in connection with an auxiliary battery and a motor having one commutator only.

Figure 10:
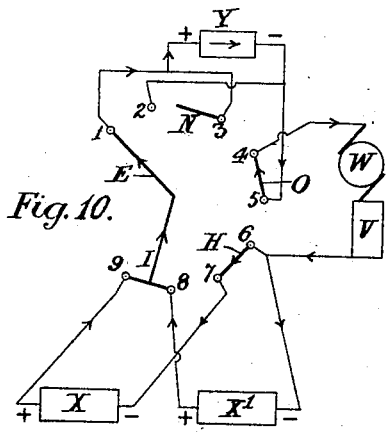

In Fig. 10 the switch-arm is in contact with the contact-stop 1, and the circuit is through said stop to the auxiliary cells Y, opposing the electromotive force of the main battery, thence through the commutator W, field V, to stops 6 and 7, and so through the two portions X X' of the main battery, which are in parallel, then to stops 9 and 8, and switch-arm I to switch-arm E.

Figure 11:
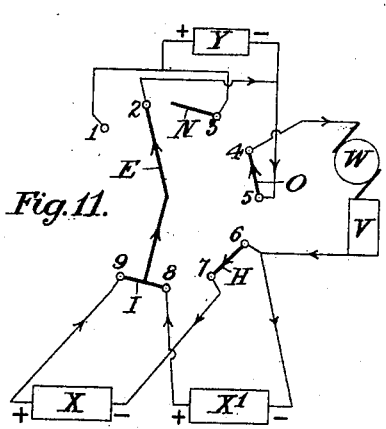

In Fig. 11 the switch-arm E is in contact with contact-stop 2, and the circuit is through said stop to the commutator W, field V, stops 6 and 7, and so to the two portions X X' of the main battery, which are still in parallel, thence to stops 8 and 9, and through switch-arm I to switch-arm E, the auxiliary cells Y being cut out.

Figure 12:
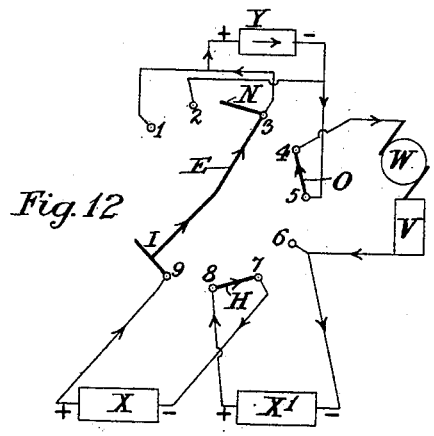

In Fig. 12 the switch-arm E is in contact with the contact-stop 3, and the circuit is closed through said stop to the auxiliary cells Y, opposing the electromotive force of the main battery, thence through commutator W, field V, and so through portion X' of the main battery, thence through stops 8 and 7, through the other portion X of the main battery, so that the two portions X X' are now in series, thence to contact 9, and so through switch-arm I to switch-arm E.

Figure 13:
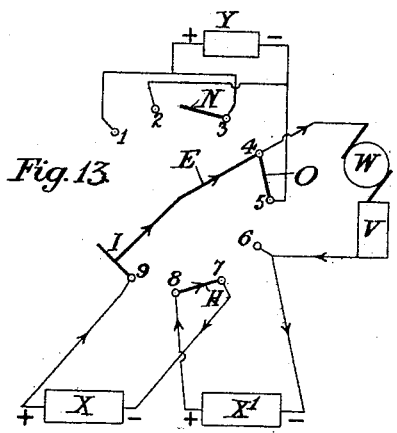

In Fig. 13 switch-arm E is in contact with the contact-stop 4, and the circuit is closed through said stop to the commutator W, field V, thence through the portions X' X of the main battery, which are still in series, and then by contact 9 through switch-arm I to switch-arm E, the auxiliary cells Y being again cut out.

Figure 14:
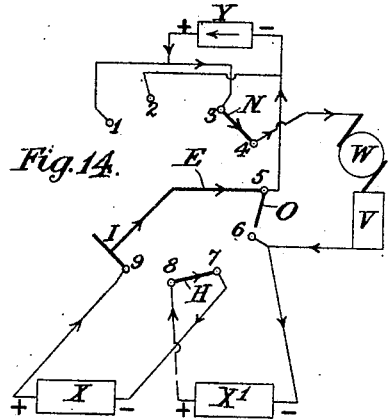

In Fig. 14 the switch-arm E is in contact with the contact-stop 5, and the circuit is closed through said stop to the auxiliary cells Y, increasing the electromotive force of the main battery, thence through the commutator W, field V, and the two portions X' X of the main battery, which still remain in series, to contact-stop 9 and through switch-arm I to switch-arm E.

It will be seen that the general working of the system described is that by the turning of a single handle varying speeds of the motor may be obtained.

It might at first appear strange that the connections shown in Figs. 5, 6, 7, 8, and 9 as relating to a motor with two commutators should be different to those shown in Figs. 10, 11, 12, 13, and 14 in connection with the alternative arrangement of having a divided main battery. A closer study will, however, show the reason to be this: that whereas in the former case, when both commutators are in parallel, the speed is highest it is lowest when the two halves of the battery are put in parallel. The uniform sequence of the switch movement necessitates the difference in connections in both cases, as shown. It will thus be seen that one main feature or element of this combination is divided and means are provided for changing the relation of said parts from multiple to series connection, or vice versa, and this feature may be either the motor having two commutators so changeable with relation to each other or a battery in two parts likewise changeable in current connection. This part of the invention is obviously also applicable to electrically-driven vehicles having a main electric source other than accumulators.

It should be mentioned that as the auxiliary cells are only required to modify the speed by adding or opposing their electromotive force the capacity of these cells need not be large and their weight can be small.

I will now describe the preferred form of switch for carrying out the second object of my invention. In Figs. 15 and 16 this switch is illustrated in a position where the first part of the movable switch-arm E' has left the contact-piece F, but E, which here is shown in the form of a disk, is still in connection with the contact F and forms the magnetic circuit through the plate D, the block C, the core B, and the spiral helix A back to H. In this position of the switch-arm the contact would continue to be alternately made and broken somewhat in the manner of an electric bell. The noise thus occasioned would warn an attendant that proper working contact was not established. In practice, however, no purpose would be served by having the switch in this position, and the contact-pieces being in general closer together than shown in the drawings the circuit as a rule is only broken once before it is established again.

One of the advantages of my invention is that I obtain my object by a cheap and simple device quite as efficient in its working as other costly and complicated devices hitherto employed for the same purpose.

What I claim, and desire to secure by Letters Patent, is—

1. The combination of an electromotor, a main battery for driving said motor, an auxiliary battery, and means for switching the current of said auxiliary battery in opposition to the main current for producing a lower rate of speed.

2. The combination of an electromotor, a main battery, an auxiliary battery, and means for switching the current of said auxiliary battery in opposition or in supplement to that of the main current for varying the speed of the motor.

3. The combination of an electromotor, a main battery for driving said motor, an auxiliary battery, and means for switching the current of said auxiliary battery into opposition to or in supplement of the main current, or for cutting out said auxiliary battery from the main circuit.

4. The combination of a motor, a main battery for driving said motor, one of said features having parts adapted to be shifted from series to multiple connection or the reverse for varying the speed of the motor, an auxiliary battery, and means for shifting the current of said auxiliary battery to augment or resist the current of the main battery for further varying the speed of the motor.

5. The combination of an electromotor having two commutators, a main battery for driving said motor, an auxiliary battery, means for switching the commutators into series or parallel for varying the speed of the motor, and means for switching the current of said auxiliary battery in opposition to or in aid of the main current for further regulating the speed of the motor.

6. The combination of stationary contacts, a duplex switch-arm comprising main and auxiliary contacts and conductors insulated from each other, a shunt-circuit connected with the auxiliary part of said switch-arm, and an electromagnet in said shunt-circuit, the auxiliary contact of the switch-arm being adapted to maintain the circuit through the shunt after the main part of the switch-arm has passed away from the stationary contact, whereby sparking at the switch is avoided.

7. The combination of stationary contacts, a duplex switch-arm comprising main and auxiliary contacts and conductors insulated from each other, a shunt-circuit connected with the auxiliary part of said switch-arm, and an electromagnet in said shunt-circuit having a movable core normally in contact with a block in said circuit, the auxiliary contact of the switch-arm being adapted to maintain the circuit through the shunt after the main part of the switch-arm has passed away from the stationary contact, whereby sparking at the switch is avoided.

OTTO CLAUDE IMMISCH.

Witnesses:
HARRY A. MCLELLAN,
W. J. FERRY.